UNITED STATES PATENT OFFICE.

FRITZ VILHELM FRIDERICHSEN, OF COPENHAGEN, DENMARK.

CATTLE-FOOD COMPOUND.

SPECIFICATION forming part of Letters Patent No. 583,739, dated June 1, 1897.

Application filed July 27, 1895. Serial No. 557,351. (No specimens.) Patented in Germany June 5, 1895, No. 84,299; in Sweden June 22, 1895, No. 7,474; in Belgium July 3, 1895, No. 116,387; in France July 5, 1895, No. 248,677; in England July 8, 1895, No. 13,176, and December 2, 1895, No. 23,066; in Norway July 9, 1895, No. 4,559; in Hungary July 12, 1895, No. 6,008; in Austria September 15, 1895, No. 45/3,308; in Luxemburg October 1, 1895, No. 2,390; in Spain October 2, 1895, No. 18,049/131; in Italy October 3, 1895, No. 39,886/195; in Canada October 11, 1895, No. 50,232, and February 16, 1897, No. 55,011; in Denmark October 14, 1895, No. 340; in Victoria December 4, 1895, No. 12,709; in South Australia December 5, 1895, No. 3,106; in Tasmania December 6, 1895, No. 1,528; in New South Wales December 6, 1895, No. 6,245; in New Zealand December 14, 1895, No. 8,141, and in Finland August 5, 1896, No. 641.

*To all whom it may concern:*

Be it known that I, FRITZ VILHELM FRIDERICHSEN, a citizen of Denmark, residing at Copenhagen, Denmark, have invented certain new and useful Improvements in Food Products, (for which I have obtained the following patents: in Denmark, No. 240, dated October 14, 1895; in Norway, No. 4,559, dated July 9, 1895; in Sweden, No. 7,474, dated June 22, 1895; in Germany, No. 84,299, dated June 5, 1895; in France, No. 248,677, dated July 5, 1895; in Belgium, No. 116,387, dated July 3, 1895; in England, No. 13,176, dated July 8, 1895, and No. 23,066, dated December 2, 1895; in Austria, No. 3,308/45, dated September 15, 1895; in Hungary, No. 6,008, dated July 12, 1895; in Spain, No. 18,049/131, dated October 2, 1895; in Italy, No. 39,886/195, dated October 3, 1895; in Luxemburg, No. 2,390, dated October 1, 1895; in Finland, No. 641, dated August 5, 1896; in Canada, No. 50,232, dated October 11, 1895, and No. 55,011, dated February 16, 1897; in New Zealand, No. 8,141, dated December 14, 1895; in Victoria, No. 12,709, dated December 4, 1895; in Tasmania, No. 1,528, dated December 6, 1895; in New South Wales, No. 6,245, dated December 6, 1895; in South Australia, No. 3,106, dated December 5, 1895,) of which the following is a specification.

The present invention consists in a new article of manufacture adapted for use as food for cattle. Heretofore various attempts have been made to use blood in food for cattle, but such mixtures deteriorated rapidly. I have found that treacle or molasses forms a very efficient preservative for blood, and I therefore produce a materially-improved food compound by combining blood and treacle or its equivalent with a suitable absorbent body. The use of the aforesaid preserving material affords a further advantage in so far as treacle in such a compound in itself forms an excellent nutritive substance for cattle. For this reason the mixture of blood and treacle or the like alone without the absorbent body is available as food for cattle.

According to my invention the improved forage is manufactured by adding a suitable quantity of treacle (about twenty-four per cent. has proved an excellent proportion) to the blood and then allowing this mixture to be absorbed by one or more of the ordinary kinds of forage commonly used in the trade, said forage forming the body of the product. The latter may then be formed into cakes or into a coarse powder by kneading, pressing, and drying. The quantity of the forage added to the blood and treacle mixture may be regulated in such a way that the final product contains nitrogen, fat, and carbohydrates in suitable proportions. The preserving property of treacle or molasses in connection with blood is due not only to the sugar contained in the treacle, but to a great extent to the other substances contained in the molasses, such as amids and organic alkaline salts. Thus while an addition of ten per cent. of sugar will not preserve blood even for one week an addition of molasses corresponding to the above-mentioned proportion of sugar will keep blood from putrefaction for years.

Having thus described my invention, I claim as new and desire to secure by Letters Patent—

1. The herein-described food product, containing blood, treacle, and a suitable absorbent body, as set forth.

2. The herein-described food product, containing blood and treacle, substantially as described.

In testimony that I claim the foregoing as my invention I have signed my name in presence of two subscribing witnesses.

FRITZ VILHELM FRIDERICHSEN.

Witnesses:
 P. HOFMAN BANG,
 ROBT. J. KIRK.